United States Patent Office 3,781,232
Patented Dec. 25, 1973

3,781,232
GRAFT COPOLYMERS HAVING BRANCHES WHICH ARE ALTERNATING COPOLYMERS, AND PROCESSES THEREFOR
Norman G. Gaylord, New Providence, N.J., assignor to Gaylord Research Institute, Inc., Newark, N.J.
No Drawing. Filed Aug. 25, 1970, Ser. No. 66,885
Int. Cl. C08f 24/56
U.S. Cl. 260—17.4 GC
11 Claims

ABSTRACT OF THE DISCLOSURE

A method for preparing novel graft copolymers in which the branches are alternating copolymers, by reacting two comonomers, under conditions whereby alternating copolymers are formed, in the presence of an agent capable of forming a complex with one of the monomers and a preformed polymer having active hydrogen atoms.

---

This invention relates generally to novel graft copolymers and more particularly, it relates to graft copolymers in which the branches thereof are copolymers containing comonomeric units in regular alternating sequence, that is, graft copolymers in which the branches are alternating copolymers, and to novel processes for the preparation of such graft copolymers, more particularly defined as alternating copolymer graft copolymers.

It is an object of the present invention to provide new and novel graft copolymers.

Another object of the present invention is to provide new and novel processes for the preparation of graft copolymers.

A further object of the invention is preparation of graft copolymers containing alternating copolymer branches.

A further object is preparation of alternating copolymer graft copolymers by adding a polymer containing labile or active hydrogen atoms to a polymerizing reaction system.

Other and further objects will become obvious from the detailed description given hereinbelow.

It is known to prepare graft copolymers from vinyl monomers by polymerizing the monomer in the presence of a polymer containing free radical sites. The latter may result for instance from the attack of free radicals generated from a free radical precursor. However, in order to function, these free radicals must be capable of abstracting hydrogen atoms from the polymer skeleton. Thus, in grafting reactions benzoyl peroxide is an effective graft initiator while azobisisobutyronitrile yields little or no graft copolymer (Allen and Merrett, Journal of Polymer Science, 22, 193 (1956); Allen, Ayrey, Moore and Scanlan, Journal of Polymer Science, 36, 55 (1959). The reason for this effect is that carbon radicals are usually inefficient hydrogen abstractors whereas acyloxy radicals are quite efficient for that purpose.

Radical sites may also be generated on the polymer skeleton as a result of chain transfer; that is, a growing polymer chain, whose growth has been initiated by a free radical derived from a catalyst or free radical precursor, may abstract a hydrogen or other abstractable atom from the backbone polymer. However, since the growing polymer chain contains a carbon radical which is an inefficient hydrogen abstractor, this is a less effective method for generating radical sites on a polymer skeleton than is the use of a suitable free radical precursor.

Under the influence of applied shear, polymer chains can be ruptured to generate free radical sites at the ruptured ends of the chains. Radical sites can also be generated on a polymer chain under the influence of ultraviolet or high energy radiation.

Regardless of the method used for generating radical sites on the polymer skeleton, the generation of such sites in the presence of a monomer results in the initiation of the polymerization of the monomer and the consequent formation of a graft copolymer.

The free radical initiated copolymerization of two monomers yields a copolymer whose composition is dependent upon the relative monomer reactivities and independent of the nature of the free radical precursor or the radical site. The composition of the copolymer chains present in a graft copolymer prepared by initiating the copolymerization of two monomers in the presence of a polymer containing free radical sites is identical with the composition of the copolymer prepared with a free radical catalyst in the absence of the polymer.

The copolymerization of a monomer containing strongly electron donating substituents with a monomer containing strongly electron withdrawing substituents yields an essentially alternating copolymer, that is, a copolymer in which the comonomer units are present in essentially equimolar quantities and are situated alternately along the copolymer chain. Alternating copolymers are also produced by the copolymerization of an electron donating monomer with an electron acceptor which does not readily undergo homopolymerization. For example, alternating copolymers are produced from the copolymerization of the electron donor monomers, styrene and butadiene, with the electron acceptor monomers vinylidene cyanide, maleic anhydride and sulfur dioxide.

The complexing of a moderately or weakly electron accepting monomer containing pendant carbonyl, carboxylate, carboxamide or nitrile groups with a Friedel-Crafts catalyst, Lewis acid or organoaluminum halide transforms the monomer into a strongly electron accepting monomer. The resultant complexed monomer undergoes copolymerization with electron donating monomers to produce alternating copolymers in the presence or absence of a free radical initiator (Gaylord and Takahashi, Journal of Polymer Science, Part B, 6, 743 (1968); ibid, 6, 749 (1968).

Free radical polymerization is characterized by an initiation step in which a free radical species generated from the free radical catalyst or precursor adds a monomer molecule and the radical site is transferred to the monomer molecule. The propagation step involves the addition of further monomer molecules with the successive transfer of the radical site to each newly added monomer unit in turn. The resultant polymer chain consequently has a terminal unit derived from the free radical catalyst. Similarly, the initiation of graft copolymerization from a radical site generated on a polymer skeleton or backbone involves the successive transfer of the radical site to the comonomer units and the establishment of the original polymer as a terminal unit or trunk of the graft copolymer.

The preparation of alternating copolymers by the free radical initiated copolymerization of comonomers, one of which is a strong electron donor and the other an electron acceptor, per se or as a result of suitable complexing, yields copolymers which contain no residues derived from the free radical initiator. As an example, the alternating copolymer prepared by the copolymerization of styrene and maleic anhydride in the presence of azobisisobutyronitrile does not contain a terminal group arising from the azo catalyst (Tsuchida, Ohtami, Nakedai, and Shinohara, Kogyo Kagaku Zasshi, 70, 573 (1967)).

Alternating copolymers can also be formed from appropriate comonomers at low temperature or as a result of thermal activation in the absence of a free radical precursor or in the presence of a free radical precursor at a temperature at which it is normally ineffective for the initiation of free radical polymerization.

It therefore becomes apparent from these prior art studies that the preparation of alternating copolymers does not proceed in the same manner as the preparation of random copolymers or homopolymers. Furthermore, it would appear from the evidence available that graft copolymers containing alternating copolymer branches could not be successfully prepared by initiation of the copolymerization by the radical sites generated on a polymer skeleton or backbone by attack of a free radical generated from a free radical precursor, as a result of chain transfer from a growing polymer chain, or as a result of applied shear or exposure to low or high energy radiation.

The ability to undergo a chain transfer reaction is a fundamental characteristic of free radical polymerization. The free radical initiated polymerization of a monomer or a mixture of comonomers in the presence of a chain transfer agent such as chloroform or carbon tetrachloride results in the abstraction of a hydrogen or a chlorine atom, respectively, thereby effecting chain termination and lowering of polymer molecular weight. The trichloromethyl radical resulting from the chain transfer reaction reinitiates polymerization and becomes incorporated into the new polymer chain.

Polymer radicals, that is, growing polymer chains, may transfer either intermolecularly or intramolecularly at any available active site on a polymer which is present during the polymerization reaction. The intermolecular chain transfer reaction is responsible for branching and for the initiation of graft copolymerization which occurs as a result of the attack of a growing polymer chain on an existing polymer.

Although chain transfer is a characteristic of free radical polymerization, it appears not to occur in the various methods for preparation of alternating copolymers. Thus, the azobisisobutyronitrile initiated copolymerization of styrene and maleic anhydride in the presence of chloroform or carbon tetrachloride yields an alternating copolymer which does not contain chlorine atoms, their absence being indicative of the absence of hydrogen or chlorine abstraction (Tsuchida, Ohtami, Nakedai and Shinohara, Kogyo Kagaku Zasshi, 70, 573 (1967)). Similarly, there is no chlorine in the products produced in the polymerization of p-dioxene and maleic anhydride in the presence of acylonitrile in chloroform solution using azobisisobutyronitrile as polymerization initiator (Iwatsuki and Yamashita, Journal of Polymer Science, Part A-1, 5, 1753 (1967)).

The copolymerization of styrene and methyl methacrylate in the presence of an organoaluminum halide which forms a complex with the methyl methacrylate, either in the absence of the presence of a free radical initiator, yields high molecular weight alternating copolymers irrespective of the ratio of comonomers in the initial monomer charge, the same results being obtained whether the reaction is carried out with toluene, chloroform or carbon tetrachloride as reaction medium, indicating that the growing copolymer chains do not participate in chain transfer reactions which result in abstraction of a hydrogen or chlorine atom (Gaylord and Antropiusova, Journal of Polymer Science, Part B, 7, 145 (1969)).

It is therefore again apparent from prior studies that the mechanism of alternating copolymerization is distinctly different from that of random copolymerization or homopolymerization and the generation of radical sites on a polymer as a result of chain transfer could not be expected to occur during the preparation of alternating copolymers. Consequently, graft copolymers containing alternating copolymer branches should not be formed as a result of intermolecular chain transfer.

It has now been discovered that graft copolymers containing alternating copolymer branches can be prepared by carrying out the copolymerization of comonomers which form alternating copolymers per se or as a result of activation through complexing thereof in the presence of homopolymers or copolymers containing labile or active hydrogen atoms.

It is most surprising and unexpected on the basis of known properties that the preparation of the alternating coplymer graft copolymers by the processes described herein can be successfully carried out both in the presence of a free radical catalyst and in the absence thereof.

The novel graft copolymers of this invention are prepared under appropriate selective conditions utilizing a polymer or copolymer which contains labile or active hydrogen atoms located on the trunk, skeleton, or backbone polymer.

The polymers which are effective as trunk or substrate polymers may be homopolymers or copolymers containing at least 10% of one of the following types of active hydrogen atoms:

(1) hydrogen atoms attached to tertiary or trisubstituted carbon atoms

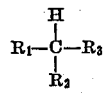

(2) hydrogen atoms attached to (a) benzylic or (b) allylic carbon atoms

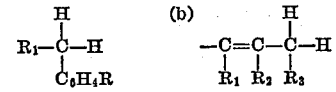

(3) hydrogen atoms attached to carbon atoms adjacent to an electron donor atom

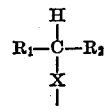

wherein X is selected from a nitrogen, sulfur or oxygen atom;

(4) hydrogen atoms attached to carbon atoms adjacent to an electron acceptor group

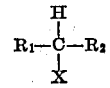

wherein X is a carbonyl, carboxyl, carboxamide, carboxylate, thiocarbonyl, thiocarboxyl, thiocarboxamide, thiocarboxylate, nitrile, nitro, or sulfonyl group;

(5) hydrogen atoms positioned adjacent to a carbonyl group

(6) hydrogen atoms adjacent to an electron donor atom

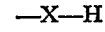

wherein X is a nitrogen, sulfur or oxygen atom.

The active hydrogen atoms required may be present on the backbone or skeleton of the trunk polymer or themselves on pendant groups.

Effective trunk polymers include but are not specifically limited to polymers derived from one or more of the following monomers: ethylene, propylene, butene, higher α-olefins having more than 4 carbon atoms, styrene, vinyltoluene, butadiene, isoprene, chloroprene, allyl acetate, allyl chloride, vinyl chloride, alkyl vinyl ether, vinyl acetate, acrolein, alkyl acrylate, alkyl methacrylate, acrylonitrile, α-methacrylonitrile, acrylamide, methacrylamide, acrylic acid, methacrylic acid, itaconic acid, alkyl vinyl sulfide and the like. The trunk polymer itself may be linear or branched. Thus, polypropylene, high and low density polyethylene and ethylene-propylene copolymers all contain tertiary carbon atoms and can be employed as effective trunk polymers.

Modified polymers obtained by chemical modification are also effective substrate polymers. Thus, chlorosulfonated polyethylene and chlorinated polyethylene are also useful as substrates.

Ring opening, polyaddition and condensation polymers and copolymers are also effective as trunk polymers. Thus, poly(ethylene oxide), poly(propylene oxide), poly(ethylenimine), poly(ethylene sulfide), polyurethanes, polyesters, polyamides, urea-formaldehyde resins, melamine-formaldehyde resins, phenol-formaldehyde resins, silicones and poly[bis(chloromethyl)oxetane] are further typical substrate polymers.

Block and graft copolymers as well as alternating copolymers are as effective as homopolymers and random copolymers provided they contain the labile or active hydrogen atoms required as set forth above.

Natural polymers such as cellulose, starch, gelatin, silk, casein, gum arabic and leather as well as derivatives of natural polymers including cellulose esters, carboxymethyl cellulose, hydroxyethyl cellulose, oxidized cellulose, oxidized starch and cellulose nitrate are also useful as trunk polymers for the invention.

The copolymerization of an electron donor monomer and a strong electron acceptor momonomer results in the formation of a substantially equimolar alternating copolymer. Thus, styrene-maleic anhydride, styrene-vinylidene cyanide, butadiene-maleic anhydride, styrene-sulfur dioxide, propylene-sulfur dioxide, alkyl vinyl ether-maleic anhydride, vinyl acetate-maleic anhydride, isobutylene-methyl α-cyanoacrylate, bicycloheptene-sulfur dioxide, 1-methylcyclopropene-sulfur dioxide, cyclopentene-sulfur dioxide, and dioxole-maleic anhydride are typical alternating copolymer-forming combinations.

The complexing of a moderately or weakly electron accepting monomer containing pendant carbonyl, carboxylate, carboxamide, thiocarbonyl, thiocarboxylate, thiolcarboxylate, thiocarboxamide or nitrile groups with a Friedel-Crafts catalyst, Lewis acid or organoaluminum halide increases the electron accepting characteristics of the monomer and, on copolymerization with an electron donor monomer, yields alternating copolymers. Thus, complexing of methyl acrylate, methyl methacrylate, acrylamide or acrylonitrile with zinic chloride, aluminum chloride, boron trifluoride, ethyl aluminum dichloride or ethyl aluminum sesquichloride permits the formation of alternating copolymers with butadiene, isoprene, styrene, propylene, ethylene and higher α-olefins.

The preparation of alternating copolymers in accord with the present invention from electron donor monomers and electron acceptor monomers per se or as a result of appropriate complexing of the electron acceptor monomer can be carried out in bulk, or in an inert solvent such as dioxane, toluene, chloroform or carbon tetrachloride, or in an aqueous medium provided neither the monomers nor complexing agent react readily with water. The reaction proceeds equally well in homogeneous or heterogeneous media.

The copolymerization of various specific comonomers to form alternating copolymers occurs spontaneously in the absence of a catalyst at temperatures as low as −100° C. or at elevated temperatures as high as 250° C. However, the addition of a free radical precursor often permits reduction of the polymerization temperature, even to temperatures as low as those at which the free radical precursor is ineffective in initiating conventional free radical polymerization or copolymerization.

The addition of a free radical precursor is necessary to catalyze the preparation of alternating copolymers from the copolymerization of those specific comonomers which do not form alternating copolymers spontaneously in the absence of a catalyst, irrespective of the temperature. Suitable free radical precursors include conventional free radical polymerization catalysts such as lauroyl peroxide, benzoyl peroxide, tert-butyl peroxypivalate, ditert-butyl peroxide, dicumyl peroxide, tert-butyl hydroperoxide, hydrogen peroxide, ascaridole, peracetic acid, ammonium persulfate, azobisisobutyronitrile and azobis(methyl isobutyrate). Ultraviolet or gamma radiation are also effective radical sources. Compounds susceptible to oxidation upon exposure to air or oxygen, such as dioxane, tetrahydrofuran and paraldehyde, also act as radical precursors after such exposure.

Various metal salts are now known to be free radical generators under suitable activation. These salts include the nitrates, nitrites, chlorates and perchlorates of silver, lithium, and magnesium as well as the ammonium salts.

Redox systems, i.e. combinations of oxidizing and reducing agent, are useful sources of free radicals, particularly where it is desired to carry out the polymerization reaction at low temperatures and/or in an aqueous medium. Typical examples of useful redox systems are potassium persulfate-sodium bisulfite, hydrogen peroxide-ferrous ammonium sulfate and ammonium persulfate-dodecyl mercaptan.

The grafting of the alternating copolymer on the substrate polymer which contains active hydrogen atoms is carried out by contacting the monomer mixture, the complexing agent where necessary and/or as desired, and the free radical precursor with the substrate polymer and carrying out the alternating copolymerization under substantially the same conditions as those used in the absence of polymer. Thus, the polymer can be dissolved in a solvent and the comonomers and radical source added. Alternately, the polymer and catalyst may be dissolved in the monomer mixture itself. An excess of one of the monomers can be used as solvent since the alternating copolymer is generally formed irrespective of the comonomer ratio. The comonomer mixture and catalyst can also be added to the dissolved polymer or to molten polymer in a suitable mixing device such as an extruder or the like.

The comonomer mixture, the complexing agent where necessary and desired and the free radical precursor can be added to a dispersion of the polymer in water or to a polymer latex or emulsion. In these cases, a water soluble free radical precursor such as ammonium persulfate or hydrogen peroxide or a redox system such as ammonium persulfate-sodium bisulfite is particularly effective.

The optimum conditions for preparing any particular alternating copolymer depend upon the particular monomer combination being reacted. Thus, reaction temperature, solvent concentration, and monomer-complexing agent ratio, where a complexing agent is necessary and/or useful and the effective free radical precursor, where a free radical source is necessary and/or useful, will vary with the individual monomers. Notwithstanding the possible variations in these conditions, the grafting reaction is generally best carried out under the conditions which are most suitable for the preparation of the specific alternating copolymer in the absence of any added polymer. That is, the conditions for grafting are determined predominantly by the specific monomer combination selected for the grafting.

The following examples are presented only as representative of the methods which are useful in the practice of this invention and should not be considered in any matter as limiting the scope thereof.

EXAMPLE 1

Preparation of polystyrene for grafting 210 g. (2.02 moles) of distilled styrene, 2.1 g. (0.087 mole) of dibenzoyl peroxide catalyst, and 190 ml. of toluene were charged into a 500 ml., 3-necked round bottomed flask. Polymerization was carried out at 90° C. for 21 hours under a nitrogen atmosphere. The yield was 174.1 g. (82.9%) of polymer after precipitation of the product with methanol. The intrinsic viscosity of the polymer was 0.255 (benzene, 25° C.) which represents a number average molecular weight of 40,500 from the equation $$[\eta] = 9.52 \times 10^{-5} \times M^{0.744}$$

(Krigbaum and Flory, Journal of Polymer Science, 11, 37 (1953)).

In a similar preparation, 20.0 g. (0.192 mole) of styrene, 20 g. of cumene and 0.8 g. dicumyl peroxide (1.54 mole percent) were polymerized under reflux and a nitrogen atmosphere for 1 hour. The yield was 20.0 g. after reprecipitation of the polymer product into methanol.

The intrinsic viscosty of the polymer was 0.1095 (benzene, 25° C.) which represents a number average molecular weight of 10,800 from the equation $$[\eta] = 4.37 \times 10^{-4} \times M^{0.66}$$

(Pepper, Journal of Polymer Science, 7, 347 (1951)).

EXAMPLE 2

Poly(styrene-maleic anhydride) alternating copolymer grafted onto polystyrene

A general procedure was used for carrying out the reaction of grafting a poly(styrene-maleic anhydride) alternating copolymer onto polystyrene and is described hereinbelow. Specific embodiments of this reaction are presented hereinafter.

Polystyrene prepared as described in Example 1 together with 1.3 times its weight of benzene, were placed in a three-necked flask equipped with a thermometer, condenser, magnetic stirrer and nitrogen inlet tube. The atmosphere in the flask was replaced by nitrogen while the polystyrene was completely dissolved with stirring. The temperature was raised and kept at 60° C. or 80° C. by a water bath. The required amount of a mixture of styrene and maleic anhydride was then added to the system under a nitrogen stream and stirring was continued for the desired amount of time.

After termination of the reaction period, dry distilled methyl ethyl ketone was added to the reaction mixture to dissolve the solids which were present. The resulting solution was poured into a mixture of benzene and petroleum ether (1:2 by volume) to precipitate the polymer, which was then reprecipitated and extracted with benzene for 24 hours to remove unreacted polystyrene.

The combined filtrate was evaporated under reduced pressure in a warm water bath and then in a high vacuum to dryness in order to remove completely any unreacted monomers.

The monomer conversion was calculated from the equation: monomer conversion,

Percent $$= \frac{\text{Product weight (g.)} - \text{Initial polystyrene weight (g.)}}{\text{Initial monomer weight (g.)}} \times 100$$

The general procedure for the grafting of an alternating poly(styrene-maleic anhydride) copolymer onto polystyrene may be shown in the following diagrammatic manner:

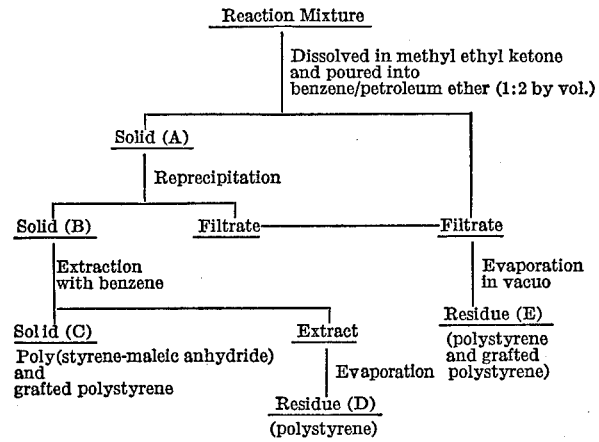

(A) Following the general procedure set forth above 4.635 g. of styrene, 4.365 g. of maleic anhydride and 1.0 g. of polystyrene from Example 1 (molecular weight 40,500) were reacted at 60° C. for 3 hours. The weight ratio of monomers to polystyrene was 9.

The reaction mixture yielded 5.22 g. of solid (A) which after reprecipitation gave 5.12 g. of solid (B). Extraction with benzene gave 5.08 g. of solid (C) and 0.04 g. of residue (D). The monomer conversion was 45.8%. Elemental analysis of solid (C) indicated the presence of highly grafted polystyrene, i.e. polystyrene grafted with the alternating poly(styrene-maleic anhydride) copolymer. The alternating copolymer content of the grafted product was 96.6 mole-percent and the polystyrene content was 3.4 mole-percent.

(B) Another graft copolymerization reaction was carried out in accord with the general procedure set forth above, using a monomers to polystyrene weight ratio of 1. The reaction of 1.54 g. of styrene, 1.46 g. of maleic anhydride and 3.0 g. of polystyrene from Example 1 (molecular weight 10,800) in 4.5 ml. of benzene was carried out at 60° C. for 1 hour. The monomer conversion was 25.7%. Solid (B) weighed 0.1 g. and after extraction with benzene gave solid (C) which analyzed as the alternating poly(styrene-maleic anhydride) copolymer. The residue (E) weighed 3.67 g. and had a maleic anhydride content (elemental analysis and titration) of 19.7 mole-percent. This indicates that residue (E) consisted of 60.6 mole-percent polystyrene grafted with 39.4 mole-percent alternating poly(styrene-maleic anhydride) copolymer.

(C) In a similar reaction using a monomers to polystyrene weight ratio of 1, a mixture of 1.03 g. of styrene, 0.97 g. of maleic anhydride and 2.0 g. of polystyrene (molecular weight 10,800) in 3 ml. of benzene was heated at 60° C. for 3 hours. The monomer conversion was 40.8%. Solid (B) weighed 0.745 g. and after extraction with benzene gave 0.735 g. of solid (C) which was identified as the alternating copolymer. Residue (E) weighed 2.07 g. and had a maleic anhydride content of 6.5 mole-percent, i.e. 86.9 mole-percent polystyrene grafted with 13.1 mole-percent alternating copolymer.

(D) Another reaction was carried out with a monomers to polystyrene weight ratio of 0.1. The reaction of 0.26 g. of styrene, 0.24 g. of maleic anhydride and 5.0 g. of polystyrene (molecular weight 10,800) in 7.5 ml. of benzene at 60° C. for 3 hours gave 4.96 of residue (E). Analysis identified residue (E) as 96.9 mole-percent polystyrene grafted with 3.1 mole-percent alternating copolymer.

(E) A similar reaction with a monomers to polystyrene weight ratio of 0.5 was carried out at 60° C. for 3 hours using 1.29 g. of styrene, 1.21 g. of maleic anhydride, 5.0 g. of polystyrene (molecular weight 10,800) and 7.5 ml. of benzene. The monomer conversion was 26.4%. Solid (B) weighed 0.46 g. and gave 0.42 g. of solid (C) which analyzed as a graft copolymer composition consisting of 7.0 mole-percent polystyrene grafted with 93.0 mole-percent alternating polystyrene-maleic anhydride) copolymer. Residue (E) weighed 5.20 g. and had a maleic anhydride content of 8.3 mole-percent. The graft copolymer composition was 83.3 mole-percent polystyrene grafted with 16.7 mole-percent alternating copolymer.

(F) A further embodiment of the invention was carried out at 80° C. for 1 hour with a monomers to polystyrene weight ratio of 1. The reaction of 1.03 g. of styrene, 0.97 g. of maleic anhydride and 2.0 g. of polystyrene (molecular weight 40,500) in 3.0 ml. of benzene gave a 17.8% monomer conversion. Solid (C) weighed 0.29 g. and analyzed as the alternating copolymer. Residue (E) weighed 2.06 g. and consisted of 90.5 mole-percent polystyrene grafted with 9.5 mole-percent alternating copolymer.

EXAMPLE 3

Poly(isoprene-maleic anhydride) alternating copolymer grafted onto polystyrene (A) The graft copolymerization of alternating poly(isoprene-maleic anhydride) copolymer onto polystyrene was carried out by charging a reaction flask equipped with a reflux condenser, thermometer, gas outlet and inlet and a magnetic stirring bar with 2.0 g. of polystyrene from Example 1 (40,500 molecular weight) and 25 ml. of distilled dioxane. This mixture was stirred under a nitrogen atmosphere until the polystyrene had dissolved completely. The addition of 9.8 g. of distilled maleic anhydride followed. A solution containing 6.8 g. of isoprene and 4.8 g. of a 75% solution of t-butyl peroxypivalate in hexane was injected with a hypodermic syringe over a period of 15 minutes into the reaction flask which had been preheated to 65° C. The reaction mixture was then stirred in a nitrogen atmosphere for 2 hours at 60–70° C. At the end of this period the reaction mixture was poured into 800 ml. of benzene. The benzene-insoluble portion, collected by filtration, weighed 12.1 g. and was identified as the alternating poly(isoprene-maleic anhydride) copolymer by elemental analysis and infrared spectrum. The benzene-soluble portion, after evaporation at 150° C. in vacuo, weighed 4.9 g. and was identified as polystyrene grafted with alternating poly(isoprene-maleic anhydride) copolymer. Elemental analysis indicated a 72 mole-percent poly(isoprene-maleic anhydride) alternating copolymer content in the alternating copolymer graft copolymer.

(B) The same experimental and product recovery procedure were used in a reaction carried out at 65–75° C. for 2 hours with the following materials, using a 10,800 molecular weight polystyrene (Example 1) as backbone polymer:

| | |
|---|---|
| Polystyrene _____ g__ | 10.0 |
| Dioxane _____ ml__ | 25 |
| Maleic anhydride _____ g__ | 2.45 |
| Isoprene _____ g__ | 1.7 |
| t-butyl peroxypivalate solution _____ g__ | 1.2 |

The benzene-insoluble portion of the reaction product, which weighed 2.2 g., was shown to be the alternating poly(isoprene-maleic anhydride) copolymer by elemental analysis and by titration of the maleic anhydride content. The benzene-soluble graft copolymer weighed 11.5 g. and contained 13 mole-percent of grafted alternating copolymer by weight increase and 14 mol-percent by elemental analysis.

(C) Under the same conditions, the following charge was used at 65–75° C. for 2 hours to graft the alternating copolymer on a 10,800 molecular weight polystyrene:

| | |
|---|---|
| Polystyrene _____ g__ | 10.0 |
| Dioxane _____ ml__ | 25 |
| Maleic anhydride _____ g__ | 0.98 |
| Isoprene _____ g__ | 0.68 |
| t-Butyl peroxypivalate solution _____ g__ | 0.5 |

The benzene-soluble portion of the reaction product weighed 10.9 g. and analyzed as an 11.4 mole-percent poly(isoprene-maleic anhydride) alternating copolymer grafted on polystyrene.

EXAMPLE 4

Poly(styrene-methyl methacrylate) alternating copolymer grafted onto polystyrene A general procedure was used for carrying out the reaction of grafting a poly(styrene-methyl methacrylate) alternating copolymer onto polystyrene in the presence of ethyl aluminum sesquichloride and is described hereinbelow.

Polystyrene with a molecular weight of 10,800, prepared in refluxing cumene as described in Example 1, was placed in a three-necked flask equipped with a stirrer, thermometer, condenser and nitrogen inlet and outlet tubes. Styrene monomer was added to the flask and the mixture was stirred under nitrogen until the polystyrene was dissolved. The required amount of methyl methacrylate was added with stirring, followed by the addition of ethyl aluminum sesquichloride. The mixture was stirred for the desired period of time while the temperature was maintained constant.

Depending upon the monomer concentration, the reaction mixture was converted to a highly swollen gel or a solid product. Benzene containing hydroquinone was added to the reaction mixture to dissolve the product. The solution was poured into methanol and the precipitated product was washed repeatedly with methanol and dried at 90° C. in vacuo.

In order to determine the extent of grafting, the product was extracted with cyclohexane for 48 hours in a Soxhlet extractor. The cyclohexane-soluble fraction, consisting of polystyrene and polystyrene grafted with short branches of poly(styrene-methyl methacrylate) alternating copolymer, was isolated by precipitation into methanol and dried in vacuo. The cyclohexane-insoluble fraction, consisting of poly(styrene-methyl methacrylate) alternating copolymer and polystyrene grafted with long branches of alternating copolymer, was dissolved in benzene, precipatated into methanol and dried in vacuo.

Specific embodiments of this general procedure are presented hereinafter.

(A) In accordance with the general procedure set forth above, 3.0 g. of polystyrene, 3.3 ml. (30 mmoles) of styrene, 3.2 ml. (30 mmoles) of methyl methacrylate and 1.69 ml. (15 mmoles) of ethyl aluminum sesquichloride were maintained at 20° C. for 3 hours. The yield of product was 8.01 g. indicating a monomer conversion of 81.9%. The cyclohexane-soluble fraction weighed 2.53 g. Elemental analysis indicated the presence of 7 mole-percent alternating poly(styrene-methyl methacrylate) copolymer grafted on 93 mole-percent of polystyrene. The cyclohexane-insoluble fraction weighed 5.37 g. and contained 13 mole-percent polystyrene upon which the alternating copolymer was grafted mixed with ungrafted alternating copolymer.

(B) Under the conditions described in the general procedure, 3.0 g. of polystyrene, 9.9 ml. (90 mmoles) of styrene, 3.2 ml. (30 mmoles) of methyl methacrylate and 1.69 ml. (15 mmoles) of ethyl aluminum sesquichloride were maintained at 20° C. for 3 hours. The yield of product was 8.40 g. This represents a 43.7% conversion based upon the monomer charge. However, since the equimolar, alternating copolymer is formed independent of monomer charge the conversion is actually 88.2% of theory. The cyclohexane-soluble fraction weighed 2.69 g. The cyclohexane-insoluble fraction weighed 5.58 g. and upon analysis was found to contain alternating copolymer grafted polystyrene with a 12 mole-percent polystyrene content.

(C) A reaction mixture containing 3.0 g. of polystyrene, 3.3 ml. (30 mmoles) of styrene, 9.6 ml. (90 mmoles) of methyl methacrylate and 5.17 ml. (45 mmoles) of ethyl aluminum sesquichloride was kept at 20° C. for 3 hours. The yield of product was 8.83 g. indicating a monomer conversion of 48.1% based upon monomer charge and 95.3% of theory. The cyclohexane-soluble fraction weighed 2.54 g. and on analysis was found to contain 6 mole-percent alternating poly(styrene-methyl methacrylate) copolymer grafted on 94 mole-percent polystyrene. The cyclohexane-insoluble fraction weighed 6.15 g. and analyzed as an alternating copolymer grafted polystyrene with a 10 mole-percent polystyrene content.

(D) Under similar conditions to those described in the previous examples, 3.0 g. of polystyrene, 3.3 ml. (30 mmoles) of styrene, 3.2 ml. (30 mmoles) of methyl methacrylate and 1.69 ml. of ethyl aluminum sesquichloride were maintained at 60° C. for 100 minutes. The product yield was 6.40 g. representing a 55.7% monomer conversion. The cyclohexane-soluble fraction weighed 2.40 g. and contained 5.2 mole-percent alternating copolymer grafted on polystyrene. The cyclohexane-insoluble fraction weighed 3.91 g. and contained 13.5% of polystyrene as the alternating copolymer graft.

EXAMPLE 5

Poly(styrene-acrylonitrile) alternating copolymer grafted onto poly(butyl acrylate)

(A) A solution of 8.0 g. (62.5 mmoles) of poly(butyl acrylate) in 60 ml. of toluene was prepared in a 250 ml. flask equipped with a mechanical stirrer and a nitrogen inlet and outlet. The addition of 14.4 ml. (125 mmoles) of styrene was followed by the addition of 8.4 ml. (125 mmoles) of acrylonitrile. The reaction mixture was maintained at 30° C. during the addition of the reactants and throughout the reaction period. Solid zinc chloride, 0.85 g. (6.25 mmoles), was added to the polymer solution and the mixture was stirred for 10 minutes. After the addition of 0.5 ml. of a 75% solution of t-butyl peroxypivalate the mixture was stirred at 30° C. for 20 hours. The polymerization was terminated by pouring the mixture into methanol. The precipitated product was filtered, washed with methanol and then extracted with methanol in a Soxhlet extractor for 16 hours. The yield of product was 16.0 g., representing a monomer conversion of 40.8%. The product was extracted with acetone to remove the ungrafted alternating copolymer. The acetone-soluble fraction was 18.2 weight-percent of the total product. Elemental analysis indicated the presence of 4 weight-percent of butyl acrylate and an equimolar styrene-acrylonitrile content. The acetone-insoluble fraction was 81.8 weight-percent of the total product. Elemental analysis showed the presence of 43.5 weight-percent of butyl acrylate and styrene and acrylonitrile in equimolar ratio.

(B) A poly(butyl acrylate) latex was prepared in the usual manner with ammonium persulfate as initiator and a sodium alkylaryl polyether sulfonate as emulsifier. The polymerization was carried out at 85–90° C. The solids content of the latex was 42.5%.

An 18.8 g. portion of the latex containing 8.0 g. of poly(butyl acrylate) was placed in a flask. After the addition of 14.4 ml. of styrene, 8.4 ml. of acrylonitrile and 0.4 g. of potassium persulfate, while maintaining the temperature at 25° C., 4.26 g. (31.25 mmoles) of solid zinc chloride was added to the reaction mixture. Although coagulation of the latex appeared to occur, the mixture was kept at 25° C. for 20 hours with stirring. After precipitation into methanol, the product was filtered, washed with methanol and extracted with methanol in a Soxhlet extractor. The yield of product was 18.2 g., representing a 51.0% monomer conversion. Extraction with acetone in a Soxhlet extractor fractionationed the product into 7.5% of an acetone-soluble fraction, which analyzed as the equimolar poly(styrene-acrylonitrile) alternating copolymer and 92.5% of an acetone-insoluble fraction, whose analysis indicated that it was a graft copolymer of poly(butyl acrylate) which contained equimolar amounts of styrene and acrylonitrile.

(C) A solution of 8 g. of poly(butyl acrylate) in 60 ml. of toluene was prepared at 30° C. After the addition of a mixture of 14.4 ml. of styrene and 8.4 ml. of acrylonitrile, 0.25 g. of benzoyl peroxide was added, followed by 4.5 ml. (10 mmoles) of a 25% solution of ethyl aluminum sesquichloride in toluene. The reaction mixture was maintained at 30° C. for 3 hours and then precipitated into methanol. The product was collected and washed repeatedly with methanol before drying in vacuo. The product yield was 10.1 g., indicating a 10.7% monomer conversion. The acetone-soluble fraction, 25.6% of the total product, was identified as a graft copolymer containing 10% poly(butyl acrylate) and styrene and acrylonitrile in equimolar proportions. The acetone-soluble fraction, 74.4% of the total product, was also identified as a graft copolymer containing equimolar amounts of styrene and acrylonitrile.

EXAMPLE 6

Poly(styrene-acrylonitrile) alternating copolymer grafted onto cellulose

The following ingredients were charged into a 3-necked 500 ml. flask equipped with stirrer, thermometer and nitrogen inlet and outlets.

| | G. |
|---|---|
| Water | 74 |
| Cellulose | 5 |
| ZnCl$_2$ (235 mmoles) | 32 |

The mixing of these ingredients for a few minutes was followed by the addition of 32 ml. (25 g.) of acrylonitrile (470 mmoles), 54.5 ml. (49 g.) of styrene (470 mmoles) and 6.75 g. of potassium persulfate (25 mmoles). The styrene-acrylonitrile mole ratio was 1 and the acrylonitrile-zinc chloride mole ratio was 2.

The temperature was raised to 40° C. and maintained at that level for 3 hours. The reaction mixture was then poured into 1.5 liters of methanol and the solid product was filtered and washed with a 3% aqueous ammonium hydroxide solution until the filtrate gave no precipitate with K$_4$Fe(CN)$_6$. The polymer obtained was washed with methanol to remove water and dried at 1 mm. pressure at 40° C. to constant weight. The product yield was 20.3 g. and the monomer conversion was 20.6%.

A portion of the polymer was extracted in a Soxhlet extractor with acetone for 72 hours to remove ungrafted copolymer and the acetone-soluble and acetone-insoluble fractions were collected. The acetone-insoluble fraction (copolymer grafted cellulose plus ungrafted cellulose) was refluxed with 100 ml. 0.5 N HCl for 6 hours to hydrolyze the cellulose and filtered. The residual solid was again extracted with acetone and the acetone-soluble fraction was recovered as grafted copolymer.

The ungrafted copolymer (acetone-soluble fraction from reaction product) represented 23.9% of the total product and the combined copolymer-grafted cellulose and ungrafted cellulose (acetone-insoluble fraction) represented 76.1% of the total product. The grafted copolymer (acetone-soluble after hydrolysis of acetone-insoluble fraction) was 68.2% and the ungrafted copolymer was 31.8% of the total copolymer formed. The percent add-on (weight of acetone-insoluble fraction from reaction product minus weight of cellulose charged) divided by (weight of cellulose charged) ×100 was 208%.

The ungrafted copolymer contained 8.68% nitrogen indicating an acrylonitrile content of 50 mole-percent. The grafted copolymer contained 8.63% nitrogen indicating an acrylonitrile content of 50 mole-percent. Therefore, both the grafted and ungrafted copolymers were equimolar, alternating poly(styrene-acrylonitrile) copolymers. The intrinsic viscosities of the ungrafted and grafted copolymers in dimethylformamide at 30° C. in a Ubelhode viscometer were 5.1 and 5.5, respectively.

EXAMPLE 7

Poly(styrene-methyl methacrylate) alternating copolymer grafted onto poly(butadiene-acrylonitrile)

A solution of 5.6 g. (31 mmoles) of a 70:30 poly(butadiene-acrylonitrile) copolymer in 50 ml. of benzene was charged into a flask, followed by the addition of 14.4 ml. of styrene. A mixture of 5.3 ml. (10 mmoles) of a 25% solution of ethylaluminum sesquichloride in toluene and 13.4 ml. of methyl methacrylate was added, followed by 0.25 g. of benzoyl peroxide dissolved in 5 ml. of benzene. The reactant additions were made under nitrogen and the reaction mixture was stirred under nitrogen for 4 hours at 40° C. The reaction was terminated by pouring the clear homogeneous, yellow mixture into methanol. The isolated product, after washing with methanol and drying, weighed 7.80 g., indicating a monomer conversion of 8.6%. Extraction in a Soxhlet extractor with acetone gave 44.2% of an acetone-soluble fraction and 55.8% of an acetone-insoluble fraction. The two fractions were analyzed and based upon the nitrogen content the amount of the original poly(butadiene-acrylonitrile) present in the fraction was calculated and based upon the oxygen content the amount of methyl methacrylate was calculated. The acetone-soluble fraction contained 90% of the 70:30 poly(butadiene-acrylonitrile) copolymer and 10% of the poly(styrene-methyl methacrylate) in which the monomers were in equimolar proportion. The acetone-insoluble fraction was an alternating copolymer graft copolymer containing 42.5% of an equimolar, alternating poly (styrene-methyl methacrylate) copolymer grafted onto 57.5% of 70:30 poly(butadiene-acrylonitrile) copolymer.

EXAMPLE 8

Poly(α-methylstyrene-methacrylonitrile) alternating copolymer grafted onto poly(butadiene-acrylonitrile)

Under the same conditions as described in Example 7, a mixture of 14.8 g. of α-methylstyrene and 8.4 g. of methacrylonitrile was added to a solution of 5.6 g. of 70:30 poly(butadiene-acrylonitrile) copolymer in 50 ml. of toluene. The addition of 13.5 ml. of a 25% solution of ethyl aluminum sesquichloride in toluene was followed by the addition of a solution of 0.25 g. of benzoyl peroxide in 5 ml. of toluene. After the addition of the organoaluminum halide the reaction mixture was converted into a mixture of gel and liquid. After 4 hours at 40° C., the reaction mixture was poured into methanol, filtered and washed with methanol. The dried rubbery product weighed 7.35 g., representing a 7.5% monomer conversion. Extraction with acetone gave 2.95 g. (40.2% of total product) of an acetone-soluble fraction and 4.40 g. (59.8% of total product) of an acetone-insoluble fraction. Analysis of the acetone-soluble fraction indicated 80% of the poly(butadiene-acrylonitrile) copolymer and 20% of equimolar poly(α - methylstyrene - methacrylonitrile). The acetone-insoluble fraction was a graft copolymer containing 26% of equimolar, alternating poly(α - methylstyrene-methacrylonitrile) copolymer grafted onto 74% of 70:30 poly(butadiene-acrylonitrile) copolymer.

The alternating copolymer graft copolymers prepared by the process of the present invention have properties which depend upon the nature of the backbone polymer and the specific alternating copolymer grafted thereon. Thus, grafting of an alternating copolymer containing carboxyl groups onto a hydrocarbon backbone increases the flexural modulus and tensile strength and enhances the adhesion to various substrates, printability, dyeability, compatibility with inorganic or organic fillers and pigments, adhesion to glass and other reinforcing fibers, dispersibility in aqueous solutions of inorganic or organic bases and crosslinkability, e.g. with polyvalent metal compounds such as zinc acetate, basic aluminum acetate or zirconyl acetylacetonate as well as metal oxides.

The grafting of an alternating copolymer which is rigid on an elastomeric backbone increases the modulus of the elastomer. Since the alternating copolymer is generally insoluble in hydrocarbon solvents it increases the oil resistance of a hydrocarbon elastomer.

The grafting of an alternating copolymer containing acrylonitrile on a substrate gives increased resistance to discoloration on heating or exposure to acids in contrast to the grafting of a non-alternating copolymer which contains sequences of acrylonitrile units, as occurs with conventional free radical grafting techniques.

The alternating copolymer graft copolymers prepared by the process of the present invention may be fabricated into shaped objects by conventional fabrication methods. They may be extruded into films, sheets, tubes, fibers, profiles and other shapes. They may also be converted into films or sheets by calendering and flat-bed pressing. The fibers produced by wet or dry spinning or film splitting may be converted into woven and non-woven structures which may be used per se or after coating or printing with conventional paper or textile coating or printing compositions. The films or fiber mats may be laminated to substrates such as metals, wood, natural or synthetic fiber or film structures, etc, and may also be metallized or metal plated.

The graft copolymers prepared by the process of the present invention may be converted into fine powders and used in the fluid bed coating of heated substrates. They may also be cold-formed or compression or injection molded into shaped objects which may be printed, coated, metallized, metal plated, etc. The blending of a blowing agent with the graft copolymer prior to fabrication or the injection of a suitable gaseous material into the molten mass permits the production of foamed objects of decreased density.

What is claimed is:

1. A process for production of alternating copolymer graft copolymers having copolymer branches in which the comonomer units are in alternating sequence, which comprises
   (1) mixing a polymer having active hydrogen atoms with (a) an electron donor monomer selected from the group consisting of alpha-olefins, aromatic substituted alpha-olefins and conjugated dienes, and (b) an electron acceptor monomer selected from the group consisting of acrylonitrile, methacrylonitrile, acrylic esters and acrylamide, and then
   (2) adding and reacting with an agent capable of forming a complex with the electron acceptor monomer, wherein said complexing agent is selected from the group consisting of Friedel-Crafts catalysts, Lewis acids and organoaluminum halides,
said reaction being carried out in bulk, or in an inert solvent, or in an aqueous medium provided neither the monomers nor the complexing agent react readily with water.

2. The process of claim 1 in which the polymer undergoing reaction has at least 10% of the total hydrogen atoms present in an active position on said polymer.

3. The process of claim 1 in which the comonomers reacted are styrene and an acrylic ester.

4. The process of claim 1 in which the polymer undergoing reaction is polystyrene.

5. The process of claim 1 in which the polymer undergoing reaction is poly(butyl acrylate).

6. The process of claim 1 in which the polymer undergoing reaction is a copolymer of butadiene and acrylonitrile.

7. The process of claim 1 in which the complexing agent is a metal halide.

8. The process of claim 1 in which the process is carried out in the presence of a free radical precursor.

9. The process of claim 7 in which the process is carried out in an aqueous medium.

10. The process of claim 8 in which the polymer undergoing reaction is cellulose.

11. The branched copolymer product produced by the process of claim 1.

References Cited

UNITED STATES PATENTS

| | | | |
|---|---|---|---|
| 3,326,870 | 6/1967 | Nakaguchi et al. | 260—85.5 |
| 3,432,577 | 3/1969 | Serniuk | 260—879 |
| 3,448,173 | 6/1969 | Ryan et al. | 260—876 |
| 3,502,604 | 3/1970 | Nakatsuka et al. | 260—29.6 |
| 3,573,235 | 3/1971 | Yamamoto et al. | 260—8 |

FOREIGN PATENTS

| | | | |
|---|---|---|---|
| 1,123,723 | 8/1968 | Great Britain. | |
| 1,123,724 | 8/1968 | Great Britain. | |
| 1,921,112 | 11/1970 | Germany | 260—876 |

OTHER REFERENCES

Yabumoto et al., Alternating Copolymerization, Jour. of Polymer Sci., vol. 7, part A-1, pp. 1577–1588 (1969).

MURRAY TILLMAN, Primary Examiner

C. J. SECCURO, Assistant Examiner

U.S. Cl. X.R.

260—8, 17 A, 824 R, 827, 844, 845, 851, 852, 854, 855, 858, 859 R, 874, 875, 876 R, 878 R, 879, 880, 881, 885, 886, 887, 897 R, 898, 901